(12) United States Patent
Ellenby et al.

(10) Patent No.: US 10,037,343 B1
(45) Date of Patent: Jul. 31, 2018

(54) SECTOR-BASED RETRIEVAL OF INFORMATION ASSOCIATED WITH GEOGRAPHIC LOCATIONS

(71) Applicant: Civic Resource Group International Incorporated, Los Angeles, CA (US)

(72) Inventors: Thomas William Ellenby, San Jose, CA (US); Peter Ellenby, Portland, OR (US); Roderick Perkins, Menlo Park, CA (US); Matthew Wong, Palo Alto, CA (US)

(*) Notice: Subject to any disclaimer, the term of this patent is extended or adjusted under 35 U.S.C. 154(b) by 0 days.

(21) Appl. No.: 15/878,146

(22) Filed: Jan. 23, 2018

Related U.S. Application Data

(60) Provisional application No. 62/519,759, filed on Jun. 14, 2017.

(51) Int. Cl.
*G06F 17/30* (2006.01)

(52) U.S. Cl.
CPC .. *G06F 17/30241* (2013.01); *G06F 17/30864* (2013.01)

(58) Field of Classification Search
USPC ........................................................ 707/769
See application file for complete search history.

(56) References Cited

U.S. PATENT DOCUMENTS

| | | | | |
|---|---|---|---|---|
| 8,572,077 | B2* | 10/2013 | Dorfman | G01C 21/26 707/724 |
| 9,488,488 | B2* | 11/2016 | Waldman | G01C 21/3602 |
| 9,491,584 | B1* | 11/2016 | Mendelson | G08G 1/14 |
| 9,501,524 | B2* | 11/2016 | Zhou | G06F 17/30424 |
| 9,691,073 | B2* | 6/2017 | Tseng | G06Q 30/02 |
| 2008/0255871 | A1* | 10/2008 | Wenzlau | G06Q 10/06 705/1.1 |
| 2011/0231133 | A1 | 9/2011 | O'Hare et al. | |
| 2012/0092528 | A1 | 4/2012 | Jung et al. | |
| 2012/0191723 | A1* | 7/2012 | Salemann | G06F 17/30241 707/741 |
| 2014/0236725 | A1 | 8/2014 | Golden et al. | |
| 2016/0357370 | A1* | 12/2016 | Willey | G06F 3/0482 |
| 2017/0323158 | A1* | 11/2017 | Gordon | G06F 3/013 |

* cited by examiner

*Primary Examiner* — Cam-Linh Nguyen
(74) *Attorney, Agent, or Firm* — Patent GC; Alexander Franco

(57) ABSTRACT

Systems and methods for the accessing of information that may be associated with static or dynamic geo-located objects, which objects may or may not have corresponding real world counterparts, utilize attributes including of one or more angles of directional access associated with the geo-located objects. Information available to a user of a mobile device can be varied depending upon an angle of directional access derived from the mobile device's real world position and pointing direction in relation to the real world position and orientation of the geo-located objects.

16 Claims, 15 Drawing Sheets

SECTOR-BASED RETRIEVAL OF INFORMATION ASSOCIATED WITH GEOGRAPHIC LOCATIONS

RELATED APPLICATIONS

The subject matter of this application is related to U.S. Provisional Application No. 62/519,759, filed on Jun. 14, 2017 which application is incorporated herein by reference.

BACKGROUND OF THE INVENTION

Currently when one uses an augmented reality (AR) application like the Monocle feature in Yelp's mobile app or a pointing search app such as the Go Lauderdale mobile app, users pointing at and viewing objects with their mobile device can point at any object from any angle. This is also true for AR mobile gaming apps like Pokémon Go. The geo-located object, that may have a corresponding real world physical counterpart or may be completely virtual, is available for address and interaction regardless of its position and natural facing side or front of the object. It may be beneficial to add an allowable angle of address and differing interactions with these geo-located objects, especially in the case of billboards, road signs, and geo-located virtual gaming applications.

SUMMARY OF THE INVENTION

Systems and methods for the accessing of information that may be associated with static or dynamic geo-located objects, which objects may or may not have corresponding real world counterparts, utilize attributes including of one or more angles of directional access associated with the geo-located objects. Information available to a user of a mobile device can be varied depending upon an angle of directional access derived from the mobile device's real world position and pointing direction in relation to the real world position and orientation of the geo-located objects.

A first method performed by a computer system includes, the computer system: storing a plurality of information content units in a database; storing in the database, for each of a plurality of objects, an object specification comprising an identifier, a shape and a geographic location of the object; for each object of the plurality of objects and in turn for each of sector of a plurality of sectors, wherein the each sector defines a geographic space, associating the sector in the database with a different one of the plurality of information content units and with the object specification for the each object; receiving a query specifying a queried geographic position and orientation; querying the database to identify a sector containing the queried geographic position, wherein the sector is associated with an object that, based on object's shape and geographic position, is intersected by a ray defined by the queried geographic position and orientation; and returning, in response to the query, an information content unit associated with the sector.

In one embodiment, at least one of the plurality of objects is a virtual object.

In one embodiment, the method further includes returning, in response to the query, an object specification associated with the identified sector.

In one embodiment, the query is received from a mobile device configured to use the returned information content unit and the object specification to provide information to a user.

In one embodiment, at least one of the information content units comprises text data configured to be displayed within an augmented reality user interface in spatial association with an associated geographic location.

In one embodiment, the returned information content unit is displayed in spatial relationship to the geographic location of the returned object specification within an augmented reality interface.

In one embodiment, each information content unit comprises one or more items selected from the group consisting of text, images, video, unstructured data and structured data.

In one embodiment, for at least one of the objects, at least one sector of the plurality of sectors defines an arc of a circle centered on the object's geographic location.

In one embodiment, for at least one of the objects, at least one of the plurality of sectors is further associated with a range of distances from the object's geographic location, whereby the sector is associated with a portion of a finite width ring centered on the object's geographic location.

In one embodiment, for at least one of the objects, at least one of the plurality of sectors is further associated with a range of speeds, and wherein the query further specifies a speed of the mobile device.

In one embodiment, for at least one of the objects, at least one of the plurality of sectors is further associated with a range of directions of travel, and wherein the query further specifies a direction of travel of the mobile device.

In one embodiment, for at least one of the objects, at least one of the plurality of sectors is further associated with a range of velocities, and wherein the query further specifies a velocity of the mobile device.

In one embodiment, for at least one of the objects, at least one of the plurality of sectors is further associated with a range of accelerations, and wherein the query further specifies an acceleration of the mobile device.

In one embodiment, the object specification further comprises an orientation of the object.

In one embodiment, the queried orientation represents an orientation of a mobile device.

In one embodiment, the queried orientation represents a direction of travel.

A second method performed by a computer system includes, the computer system: storing a plurality of information content units in a database; storing in the database, for each of a plurality of objects, an object specification comprising an identifier, a shape and a geographic location of the object; for each object of the plurality of objects and in turn for each of sector of a plurality of sectors, wherein the each sector defines a geographic space, associating the sector in the database with a different one of the plurality of information content units and with the object specification for the each object; receiving a query specifying a geographic position; querying the database to identify a sector containing the specified geographic position; and returning, in response to the query, an information content unit and an object specification associated with the identified sector.

In one embodiment, the query is received from a mobile device configured to use the returned information content unit and the object specification to provide information to a user.

In one embodiment, at least one of the information content units comprises text data configured to be displayed within an augmented reality user interface in spatial association with an associated geographic location.

In one embodiment, the returned information content unit is displayed in spatial relationship to the geographic location of the returned object specification within an augmented reality interface.

In one embodiment, each information content unit comprises one or more items selected from the group consisting of text, images, video, unstructured data and structured data.

In one embodiment, for at least one of the objects, at least one sector of the plurality of sectors defines an arc of a circle centered on the object's geographic location.

In one embodiment, for at least one of the objects, at least one of the plurality of sectors is further associated with a range of distances from the object's geographic location, whereby the sector is associated with a portion of a finite width ring centered on the object's geographic location.

In one embodiment, for at least one of the objects, at least one of the plurality of sectors is further associated with a range of speeds, and wherein the query further specifies a speed of the mobile device.

In one embodiment, for at least one of the objects, at least one of the plurality of sectors is further associated with a range of directions of travel, and wherein the query further specifies a direction of travel of the mobile device.

In one embodiment, for at least one of the objects, at least one of the plurality of sectors is further associated with a range of velocities, and wherein the query further specifies a velocity of the mobile device.

In one embodiment, for at least one of the objects, at least one of the plurality of sectors is further associated with a range of accelerations, and wherein the query further specifies an acceleration of the mobile device.

In one embodiment, the object specification further comprises an orientation of the object.

A third method performed by a computer system includes, the computer system: storing a plurality of information content units in a database; storing a plurality of geographic locations in the database; for each geographic location of the plurality of geographic locations and in turn for each of sector of a plurality of sectors, wherein the each sector defines a geographic space, associating the sector in the database with a different one of the plurality of information content units and with the each geographic location; receiving a query specifying a geographic position; querying the database to identify a sector containing the specified geographic position; and returning, in response to the query, an information content unit and a geographic location associated with the identified sector.

In one embodiment, the query is received from a mobile device configured to use the returned information content unit and the geographic location to provide information to a user.

In one embodiment, at least one of the information content units comprises text data configured to be displayed within an augmented reality user interface in spatial association with an associated geographic location.

In one embodiment, the returned information content unit is displayed in spatial relationship to the geographic location associated with the identified sector within an augmented reality interface.

In one embodiment, each information content unit comprises one or more items selected from the group consisting of text, images, video, unstructured data and structured data.

In one embodiment, for at least one geographic location, at least one sector of the plurality of sectors defines an arc of a circle centered on the geographic location.

In one embodiment, for at least one of the geographic locations, at least one of the plurality of sectors is further associated with a range of distances from the geographic location, whereby the sector is associated with a portion of a finite width ring centered on the geographic location.

In one embodiment, for at least one of the geographic locations, at least one of the plurality of sectors is further associated with a range of speeds, and wherein the query further specifies a speed of the mobile device.

In one embodiment, for at least one of the geographic locations, at least one of the plurality of sectors is further associated with a range of directions of travel, and wherein the query further specifies a direction of travel of the mobile device.

In one embodiment, for at least one of the geographic locations, at least one of the plurality of sectors is further associated with a range of velocities, and wherein the query further specifies a velocity of the mobile device.

In one embodiment, for at least one of the geographic locations, at least one of the plurality of sectors is further associated with a range of accelerations, and wherein the query further specifies an acceleration of the mobile device.

In one embodiment, a computer system includes at least one processor and a non-transitory memory where the memory stores computer code that when executed by the at least one processor causes the at least one processor to perform any of the foregoing methods.

In one embodiment, a non-transitory computer readable medium stores computer code that when executed by at least one computer processor causes the at least one computer processor to perform any of the foregoing methods.

A computer system includes at least one processors and at least one memory, the at least one memory storing instructions that, when executed, cause the at least one processors to perform any of the foregoing methods.

A non-transitory computer-readable medium, storing instructions that, when executed, cause at least one processors of a computer system to perform any of the foregoing methods.

DETAILED DESCRIPTION

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted.

In accordance with various embodiments, geo-located objects, which can be virtual objects or real objects, can be associated with ranges, access angles and directions which can define access sectors, which in turn can be associated with information content related to the objects. While real objects can relate to actual objects that exist in the real world, such as a billboard or a building, virtual objects need not exist in the real world and can represent mere geographic locations or points in the real world without any corresponding structure or object. Any one of a plurality of access sectors associated with an object can be used to supply different information about the object specific to the access sector from which the object is being addressed. By way of example, if a two-sided billboard is being viewed or addressed from the north, different information can be supplied through an augmented reality application than if the billboard is addressed or viewed from the south.

Both real and virtual objects can be used in conjunction with augmented reality (AR). AR is about harvesting information from the real world and delivering it to the user with a multitude of means and formats, the bridge between all the digital information associated with the real world and the people of the world. Use of AR can involve first addressing an object, seeing it or having it appear on a list, and then engaging with that object in some way, viewing a video about it, seeing what It looked like in the past, seeing social media about the object, launching an audio file about the object etc. The embodiments provide new and unique ways of addressing and engaging with objects in a variety of AR applications and platforms. It should be noted that the engagement with the addressed object may happen at a later time. The objects can also be used for spatially aware computing, where information related to a geographic location is provided to a user other than through an AR interface.

Figure 1:
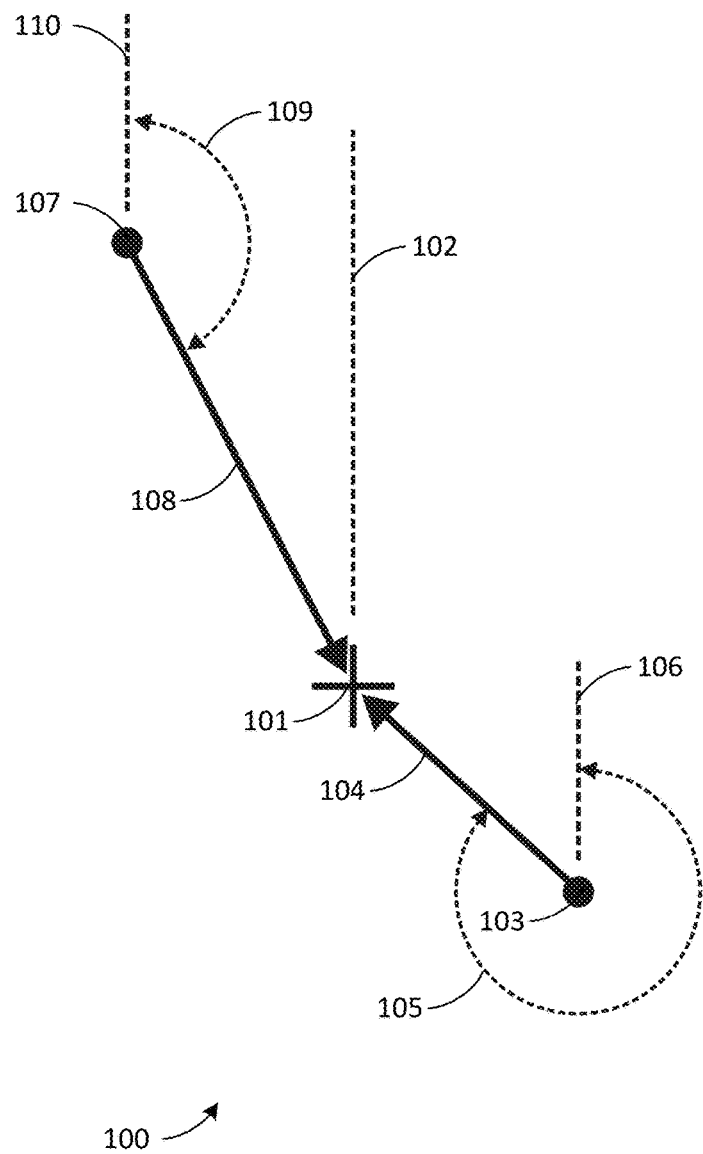
FIG. 1 is a graphic illustrating, in plan view, devices at two separate locations addressing a geolocated object that is a simple point.

FIG. 1 is a graphic 100 illustrating, in plan view, devices at two separate locations addressing a geolocated object 101 that is a simple point. The first device 103 includes a location sensor and a heading sensor which combined define a ray 104 related to the first device with a determined bearing of 325 degrees in relation to the local coordinate system zero bearing 106. Therefore the first device can then be said to be addressing the geolocated object 101 from the reciprocal bearing of the ray related to the first device 104, i.e. the first device is addressing the geolocated object from a direction of 145 degrees in relation to the local coordinate system zero bearing 102. Similarly, the second device 107 also includes a location sensor and a heading sensor which combined define a ray 108 related to the first device with a determined bearing of 150 degrees in relation to the local coordinate system zero bearing 110. Therefore the second device can be said to be addressing the geolocated object 101 from the reciprocal bearing of the ray related to the second device 108, i.e. the second device is addressing the geolocated object from a direction of 330 degrees in relation to the local coordinate system zero bearing 102.

Figure 2:
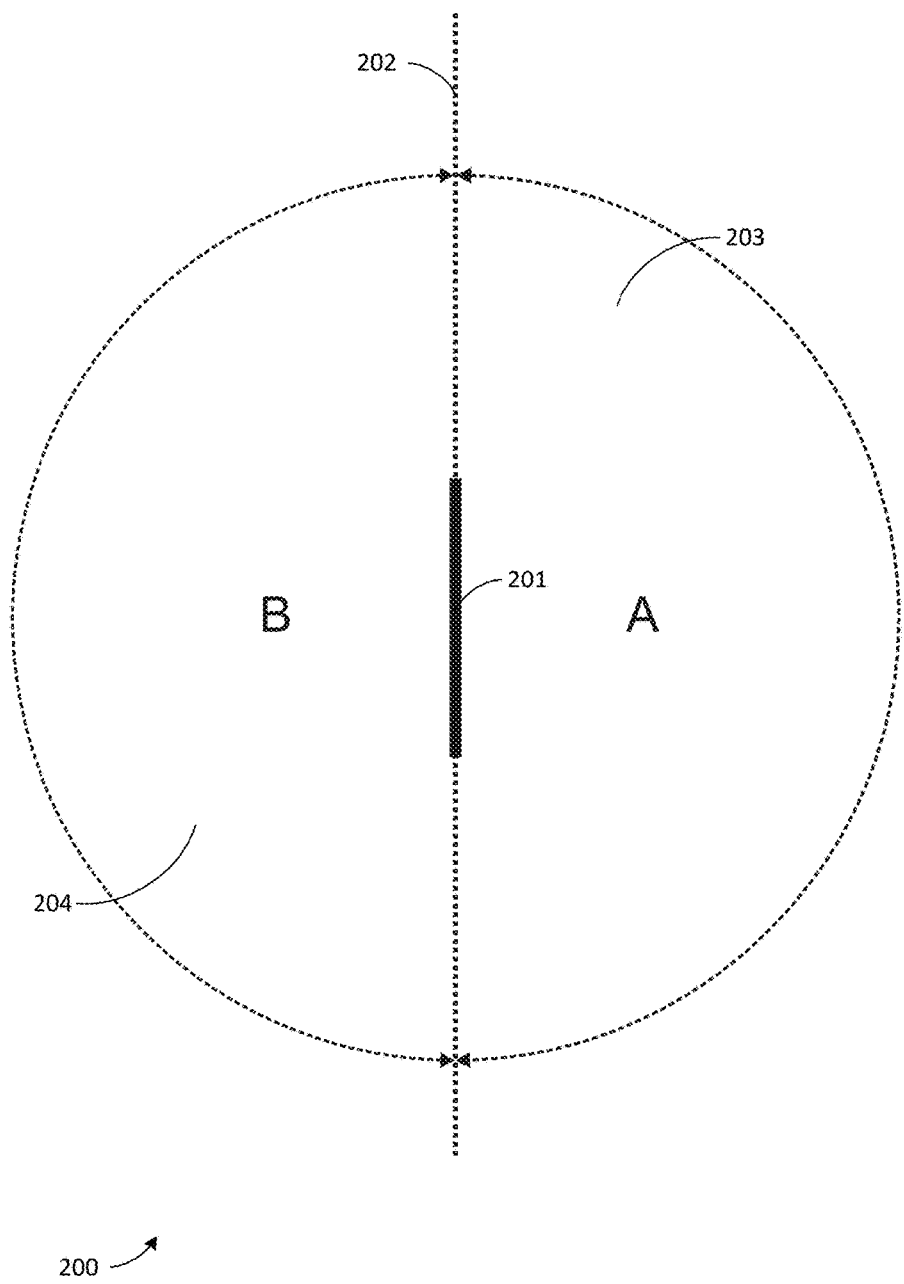
FIG. 2 is a graphic illustrating, in plan view, a line segment, its axis and its related address sectors.

FIG. 2 is a graphic illustrating, in plan view, a line segment 201, its axis 202 and its related address sectors 203 & 204. If the line segment 201 is addressed, i.e. a ray intersects the line segment, from a bearing of 0-180 degrees relative to the axis of the line segment 202 then the line segment 201 can be said to be addressed from address sector A 203. If the line segment 201 is addressed, i.e. a ray intersects the line segment, from a bearing of 180-360 degrees relative to the axis of the line segment 202 then the line segment can be said to be addressed from address sector B 204. It should be appreciated that for simplicity of explanation, only two address sectors have been illustrated but it should be evident that other configurations of address sectors are possible. For example a line segment such as is illustrated may have three address sectors defined as from 0-90 degrees being sector A', from 90-180 degrees being defined as sector B', and from 180-360 degrees being defined as sector C'. The address sectors need not be equal in extent, may overlap, and need not cover the full 360 degrees, i.e. there may be gaps in the address sectors. The specific arrangement of address indicators can be determined on a case-by-case basis as relates to specific geolocated objects.

Figure 3:
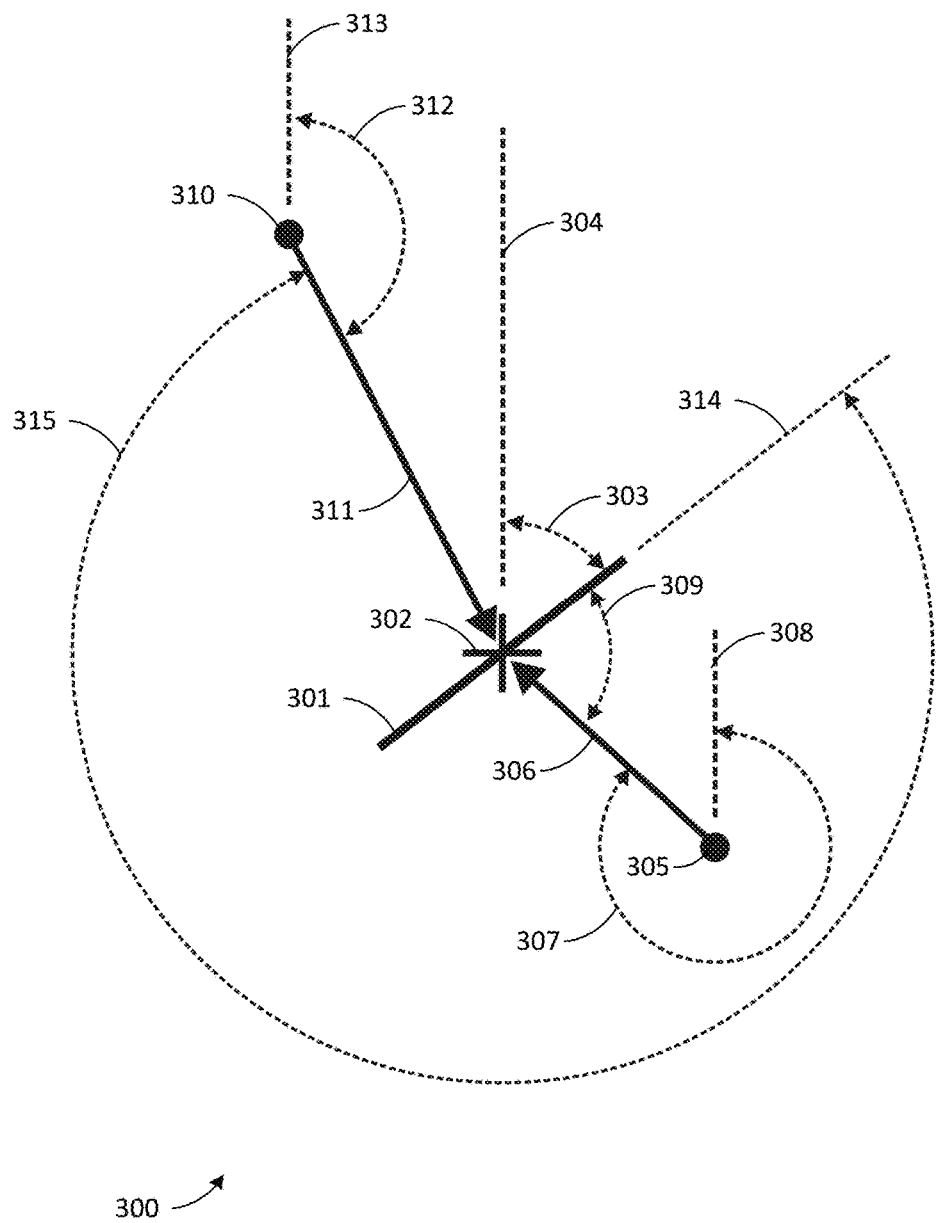
FIG. 3 is a graphic illustrating, in plan view, devices at two separate locations addressing a geolocated object that is a line segment.

FIG. 3 is a graphic 300 illustrating, in plan view, devices at two separate locations addressing a geolocated object 301 that is a line segment, with attributes as described in FIG. 2 and related text, having an associated point reference 302 and a defined angular offset 303 of its axis 314 of 60 degrees in relation to the local coordinate system zero bearing 304. For the first device 305, a system, embodiments of which are described in further detail below, determines whether the ray 306 defined by the determined position and heading of the first device 305 intersects the geolocated line segment 301 by performing an incidence calculation. Having ascertained that the ray 306 does indeed intersect the line segment 301, the system then determines the angle of address of the ray 306 associated with the first device relative to the axis 314 of the line segment 301 by comparing the determined heading 307, in this case 325 degrees in relation to the local coordinate system zero bearing 308, of the first device 305 with the angular offset 303 of 60 degrees of the line segment 301. The angle of address 309 from the first device 305 to the line segment 301 is therefore determined to be 75 degrees relative to the axis 314 of the line segment. The first device 305 can therefore be said to be addressing the line segment from address sector A. Similarly, for the second device 310 the system determines whether the ray 311 defined by the determined position and heading of the second device 310 intersects the geolocated line segment 301 by performing an incidence calculation. Having ascertained that the ray 311 does indeed intersect the line segment the system then determines the angle of address of the ray 311 associated with the second device relative to the axis 314 of the line segment 301 by comparing the determined heading 312, in this case 150 degrees in relation to the local coordinate system zero bearing 313, of the second device 310 with the angular offset 303 of 60 degrees of the line segment 301. The angle of address 315 from the second device 310 to the line segment 301 is therefore determined to be 270 degrees relative to the axis 314 of the line segment. The second device 310 can therefore be said to be addressing the line segment from address sector B. Alternatively the sensed/determined heading of the mobile device may be replaced by the relative bearing between the location of the device and the location of the object to achieve the same effect.

Figure 4:
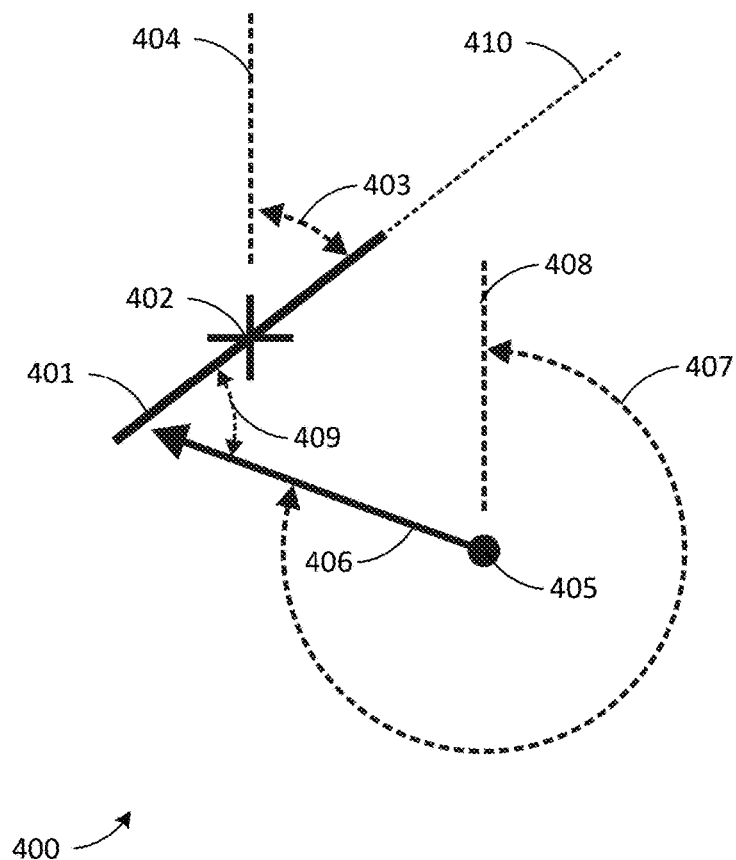
FIGS. 4 and 5 are graphics illustrating, in plan view, a device addressing a geolocated object that is a line segment from the same location but with differing angles of address.
Figure 5:
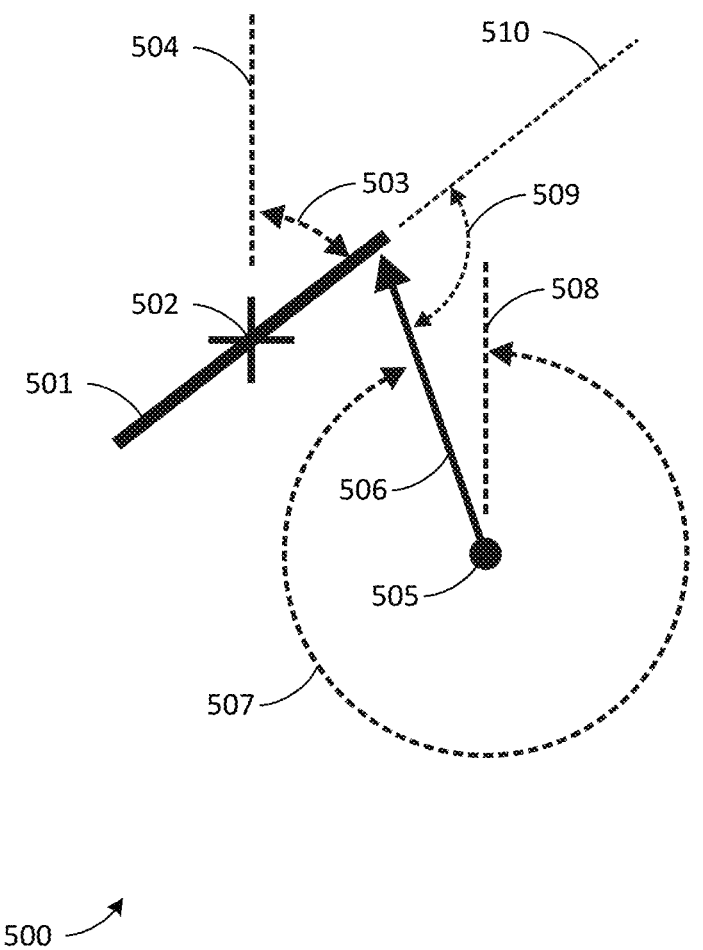

FIGS. 4 and 5 are graphics illustrating, in plan view, a device 405, 505 addressing a geolocated object 401, 501 that is a line segment, with attributes as described in FIG. 2 and related text, having an associated point reference 402, 502 and a defined angular offset 403, 503 of its axis of 60 degrees in relation to the local coordinate system zero bearing 404, 504. In both FIGS. 4 and 5 the determined heading of the device does intersect the line segment but does not pass through the point reference of the line segment. This illustrates that from the same location, a geolocated object can be addressed from multiple angles. In FIG. 4, having ascertained that the ray 406 does indeed intersect the line segment 401, the system then determines the angle of address of the ray 406 associated with the device relative to the axis 410 of the line segment 401 by comparing the determined heading 406, in this case 290 degrees in relation to the local coordinate system zero bearing 408, of the device 405 with the angular offset 403 of 60 degrees of the line segment 401. The angle of address 409 from the device 405 to the line segment 401 is therefore determined to be 50 degrees relative to the axis 410 of the line segment. The device can therefore be said to be addressing the line segment from address sector A. In FIG. 5, having ascertained that the ray 506 does indeed intersect the line segment 501 the system then determines the angle of address of the ray 506 associated with the device relative to the axis 510 of the line segment 501 by comparing the determined heading 506, in this case 340 degrees in relation to the local coordinate system zero bearing 508, of the device 505 with the angular offset 503 of 60 degrees of the line segment 501. The angle of address 509 from the device 505 to the line segment 501 is therefore determined to be 100 degrees relative to the axis 510 of the line segment. The device can therefore again be said to be addressing the line segment from address sector A.

Figure 6:
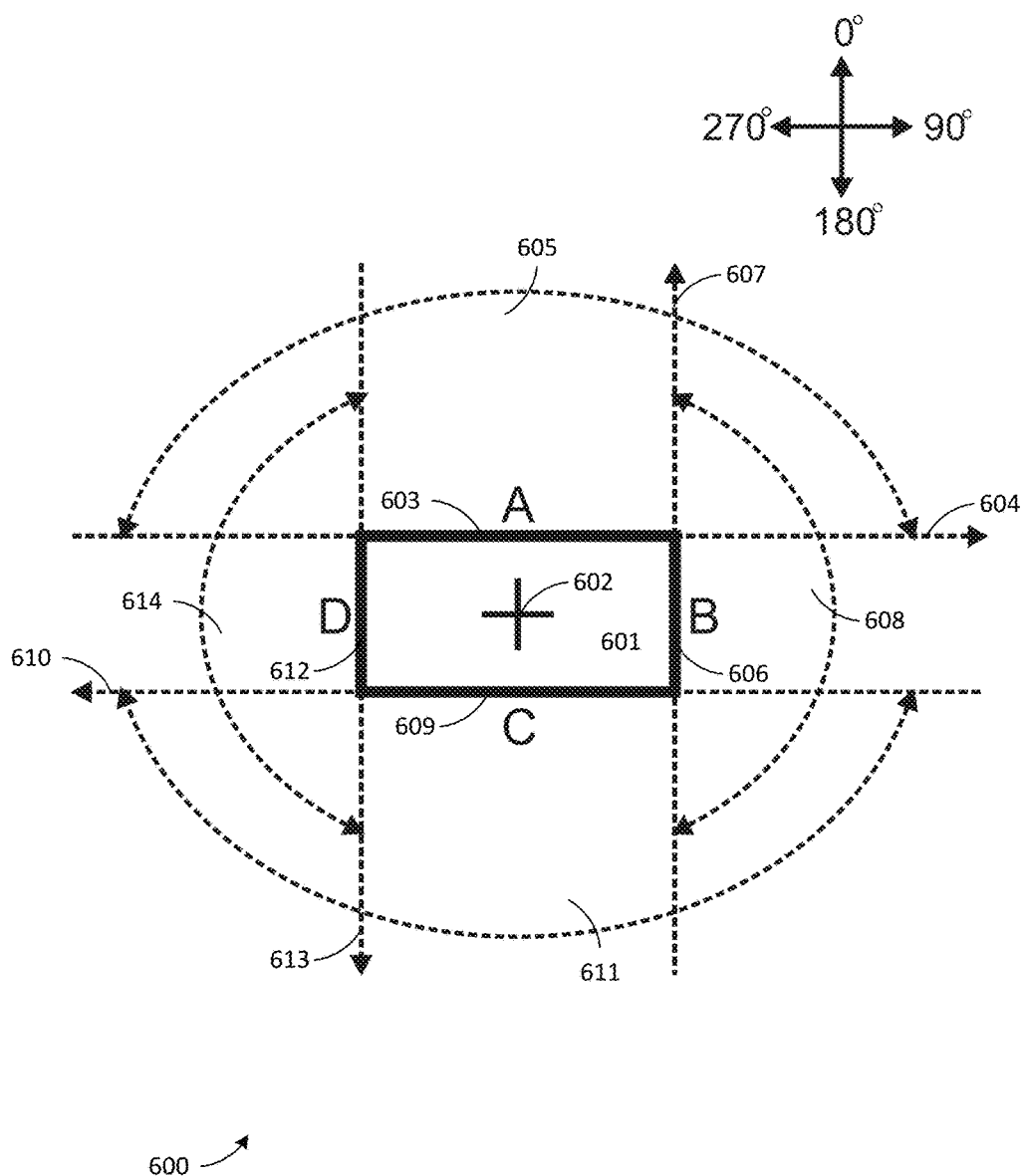
FIG. 6 is a graphic illustrating, in plan view, a geolocated geometric object, in this case a rectangle, and its related address sectors.

FIG. 6 is a graphic 600 illustrating, in plan view, a geolocated geometric object 601, in this case a rectangle, and its related address sectors. The geomantic object 601 has an associated point and orientation reference 602 and is made up of multiple discrete elements each with defined address sectors. For the purposes of implementation, the geometric object 601 can be represented as four separately addressable objects A, B, C and D, each of which will be referred to as an element for the purpose of discussion below. Element A 603 has a reference axis 604 whose bearing is 90 degrees relative to the local point and orientation reference 602 of the object, a result address sector 605 of from 180 to 360 degrees relative to its reference axis, and a null address sector of from 0 to 180 degrees relative to its reference axis. Element B 606 has a reference axis 607 whose bearing is 0 degrees relative to the local point and orientation reference 602 of the object, a result address sector 608 of from 0 to 180 degrees relative to its reference axis, and a null address sector of from 180 to 360 degrees relative to its reference axis. Element C 609 has a reference axis 610 whose bearing is 270 degrees relative to the local point and orientation reference 602 of the object, a result address sector 611 of from 180 to 360 degrees relative to its reference axis, and a null address sector of from 0 to 180 degrees relative to its reference axis. Element D 612 has a reference axis 613 whose bearing is 180 degrees relative to the local point and orientation reference 602 of the object, a result address sector 614 of from 0 to 180 degrees relative to its reference axis, and a null address sector of from 180 to 360 degrees relative to its reference axis.

Figure 7:
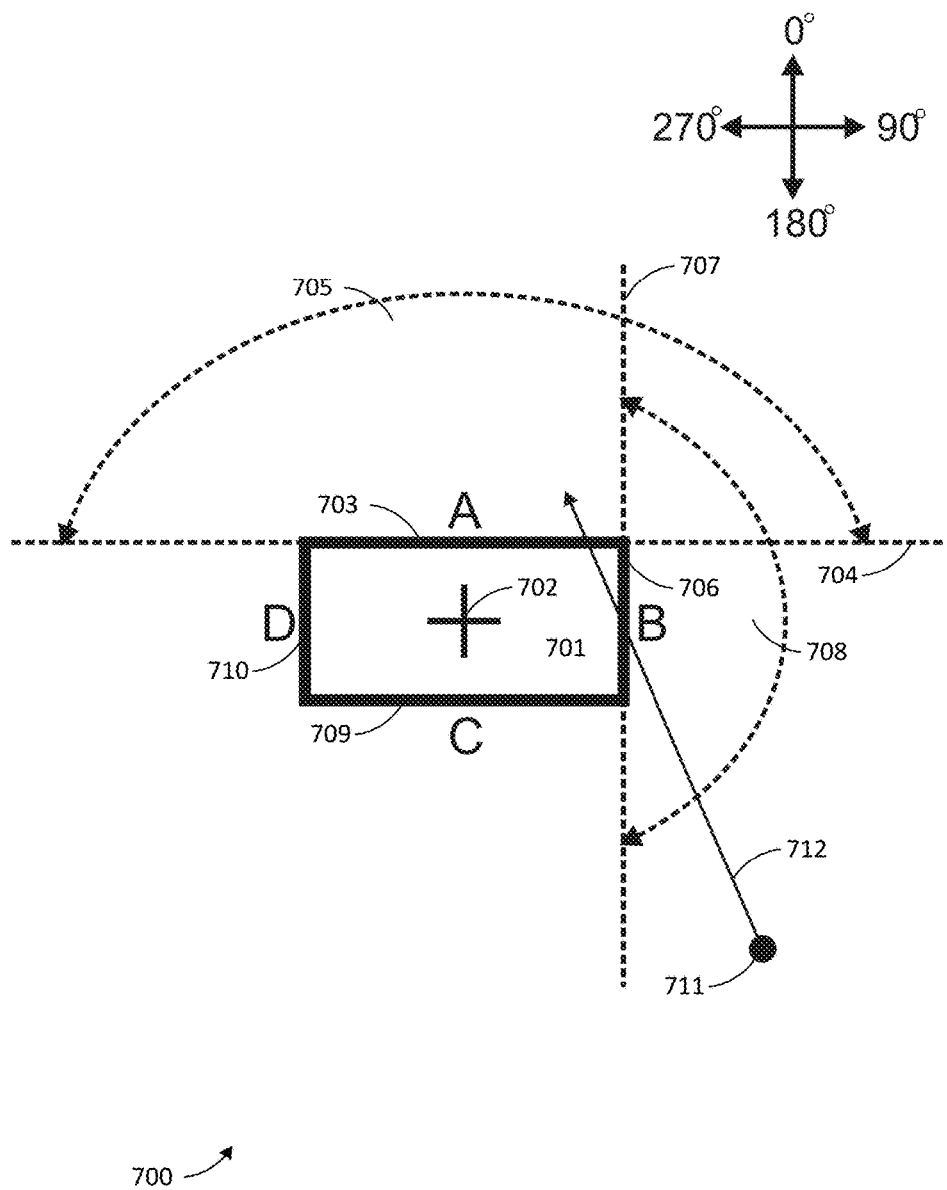
FIGS. 7 and 8 illustrate a method for determining which element of a geolocated object is of interest to a device whose determined position is the same but whose determined headings are different.
Figure 8:
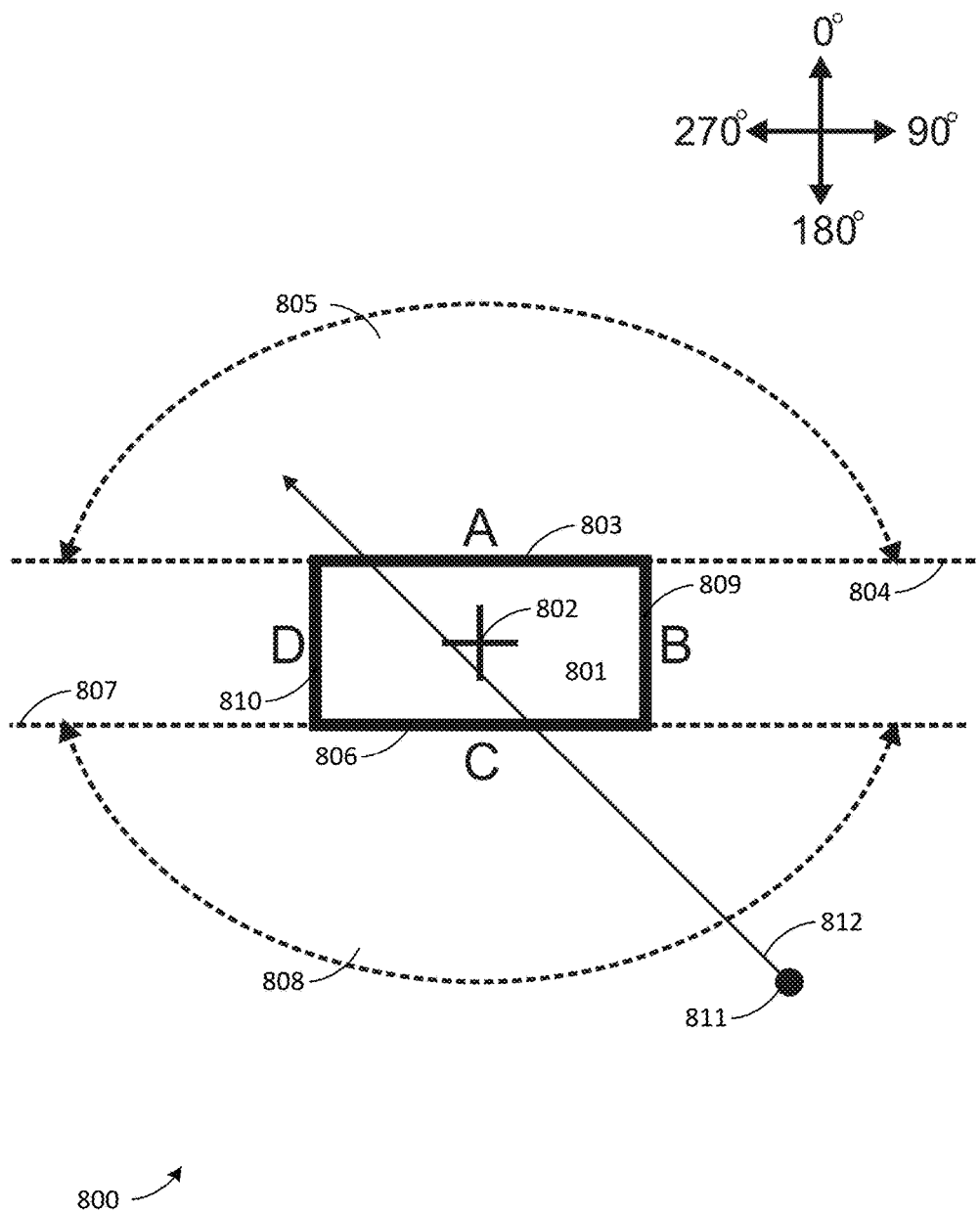

FIGS. 7 and 8 illustrate two schematics for determining which element of a geolocated object is of interest to a device whose determined position is the same, relative to the object, but whose determined heading is respectively different in each of the two illustrations. An example of this may be a user of such a device standing on one corner of an intersection addressing a building that is diagonally across the intersection. Two faces of the building are in view. Depending on the heading of the device, the system may determine which face of the building is of interest.

FIG. 7 is a graphic 700 illustrating, in plan view, a device addressing the geolocated geometric object 701 from a determined location 711. The system initially determines whether the ray 712 defined by the determined position and heading of the device intersects one or more elements of the object 701 by performing an incidence calculation. Having ascertained that the ray 712 does intersect elements A 703 and element B 706 of the object, and does not intersect elements C 709 or D 710, the system then determines the angle of address for each element. For element A, it is determined that the angle of address is 60 degrees relative to the reference axis 704 of element A. For element A, the result address sector that will return results 705 is 180-360 degrees relative to its reference axis and therefore, given the determined angle of address of 60 degrees, no result is returned for element A. For element B, it is determined that the angle of address is 150 degrees relative to the reference axis 707 of element B. For element B, the result address sector that will return results 708 is 0-180 degrees relative to its reference axis and therefore, given the determined angle of address of 150 degrees, a result is returned. In this way, the system may determine that the element of interest given the determined pointing ray is element B and not element A.

FIG. 8 is a graphic 800 illustrating, in plan view, a device addressing the geolocated geometric object 801 from a determined location 811. The system initially determines whether the ray 812 defined by the determined position and heading of the device intersects one or more elements of the object 801 by performing an incidence calculation. Having ascertained that the ray 812 does intersect elements A 803 and element C 806 of the object, and does not intersect elements B 809 or D 810, the system then determines the angle of address for each element. For element A, it is determined that the angle of address is 45 degrees relative to the reference axis 804 of element A. For element A, the result address sector that will return results 805 is 180-360 degrees relative to its reference axis and therefore, given the determined angle of address of 45 degrees, no result is returned for element A. For element C, it is determined that the angle of address is 225 degrees relative to the reference axis 807 of element C. For element C, the result address sector that will return results 808 is 180-360 degrees relative to its reference axis and therefore, given the determined angle of address of 225 degrees, a result is returned. In this way, the system may determine that the element of interest given the determined pointing ray is element C and not element A.

An alternate method to determine the element of an object that is of interest may be to determine the distance between the determined position of the device and the point of intersection of the ray with each element. The system would then determine the angle of address only for the element whose point of intersection with the ray is closest to the determined position of the device.

Figure 9:
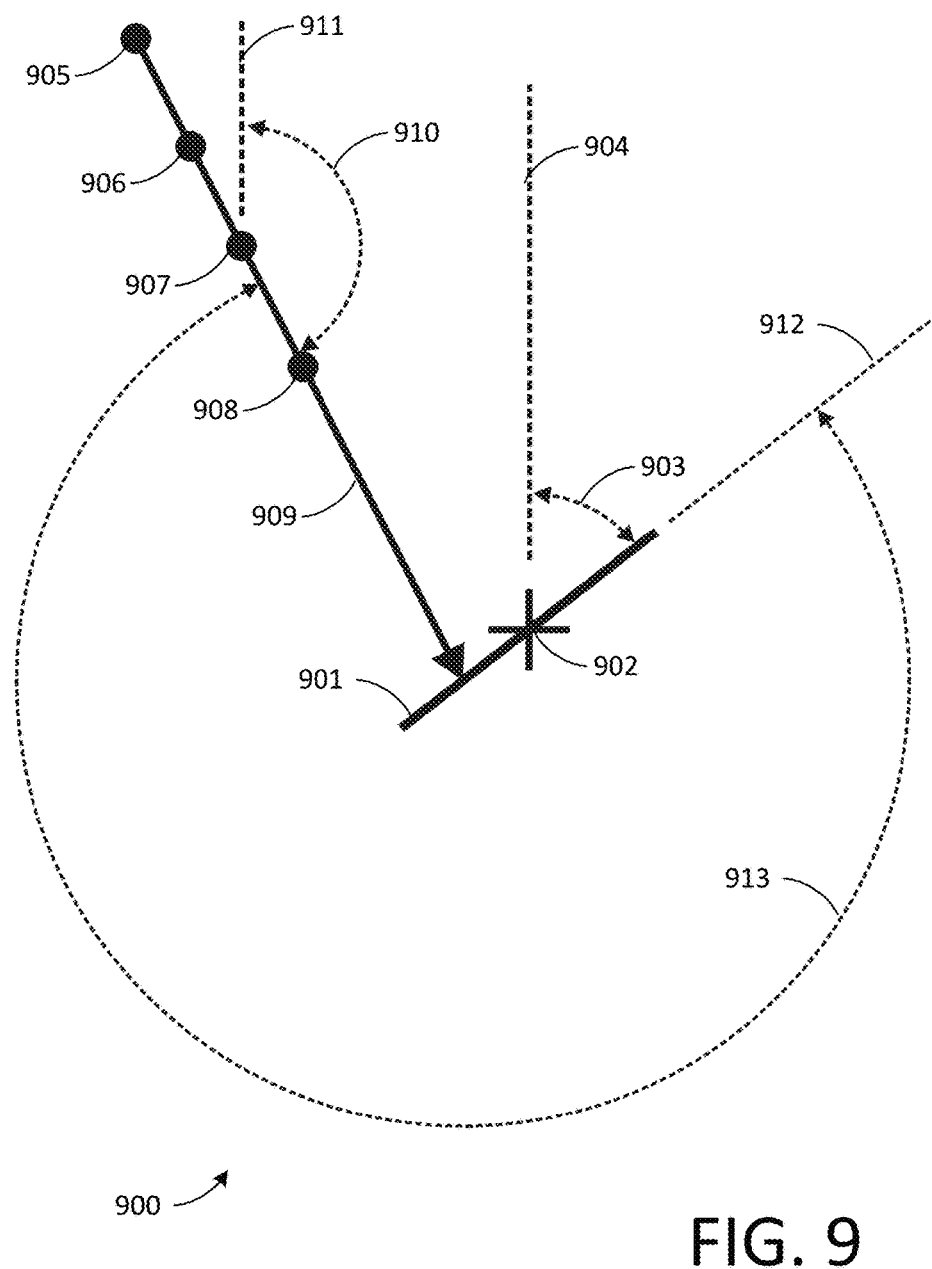
FIG. 9 is a graphic illustrating, in plan view, a device in motion addressing a geolocated object.

FIG. 9 is a graphic 900 illustrating, in plan view, a device in motion addressing a geolocated object 901 that is a line segment, with attributes as described in FIG. 2 and related text, having an associated point reference 902 and a defined angular offset 903 of its axis 912 of 60 degrees in relation to the local coordinate system zero bearing 904. The motion of the device is monitored by determining the locations 905, 906, 907 & 908 of the device at specified time intervals. The system may then determine a direction of motion ray 909 of the device based upon the determined locations of the device over time. The system then determines whether the direction of motion ray 909 intersects the geolocated line segment 901 by performing an incidence calculation. Having ascertained that the direction of motion ray 909 does indeed intersect the line segment 901 the system then determines the angle of address of the direction of motion ray 909 associated with the device relative to the axis 912 of the line segment 901 by comparing the bearing 910 of the determined direction of motion ray 909, in this case 150 degrees in relation to the local coordinate system zero bearing 911, of the device with the angular offset 903 of 60 degrees of the line segment 901. The angle of address 913 of the direction of motion ray 909 to the line segment 901 is therefore determined to be 270 degrees relative to the axis 912 of the line segment. The device can therefore be said to be addressing the line segment from address sector A.

Although the foregoing examples are generally described in two dimensions, such as referring to the object 301 as a line segment, embodiments of the invention can be implemented in one spatial dimension (e.g. based on distance and/or speed alone), two dimensions (e.g. based on angle of address, distance, velocity), or three dimensions. Accordingly the foregoing principles are also applicable to three dimensional objects such as billboards, buildings, etc. and three dimensional addressing of objects using all three degrees of freedom of heading sensing (e.g. pitch, roll and yaw). In a three dimensional implementation of FIG. 3, the object 301 could be implemented as a rectangular planar surface, such as a billboard or an even a more complex irregular surface, such as a publicly displayed sculpture or building facade.

In the foregoing examples, which It should also be appreciated that the addressing of an object may not just be a simple ray but may be a shape associated with a ray. Such a shape in three dimensions could, for example, be the field of view of an imaging device such as a camera with the ray being the optic axis of the camera. As an alternative to using a field of view in place of a ray, the shape of an object to be detected can be enlarged so that a ray represented by the center of a camera's field of view intersects a virtual object that is substantially larger than the actual object to be detected whenever the actual object would be approximately in the field of view of the camera. Additional dimensions or variables can also be taken into account when defining sectors relative to an object, such as by taking into account not only a 3-dimensional angle of address, but also a velocity and/or acceleration of the addressing device.

An example of the methods described herein can be understood by the following use of the system. There are objects that exist, billboards for example, that have two or sometimes more sides. It would be beneficial for a user to be able to access information relating to a billboard using and augmented reality (AR) or a spatially aware pointing device and have the information accessed be relevant to the user and their query. For this example, we have a user who is in San Francisco walking north along 4th street just south of King Street. There is a large two-sided billboard ahead of them with one side directly facing them (south) and the other side facing directly away from them (north). One side of the billboard, the one facing the user, has an advertisement for a car that the user is very interested in. The other side, the side that contains content probably unknown to the user since it is not viewable from their current location, has an advertisement for a beverage. When pointing their mobile device at the billboard, only the south facing side of billboard would be addressable by the user. The north side would not be addressable, since its angle of allowed address does not fit the user's query based on their current location relative to the billboard. The user would only be shown information about the car they were interested in, specs, price, nearest dealer etc. and no information about the beverage advertisement on the other side. Each side of the billboard may have an allowable angle of address of 180 degrees either to the north or to the south depending on the side of the billboard. This angle could be decreased or increased as seen fit by the designer of the application. The sector of allowable address may also be dependent on a user's distance from, or velocity relative to or away from the object. It should also be noted that the same user could use the system to interact with the billboard's addressable sectors by only using a mapping application, and not an AR system. The mapping application needs no camera input nor even a compass to function properly. By determining the user's position relative to the billboard, the system would know what addressable sector of the billboard the user was in and then serve the user the proper information, the car information relating to the addressable sector they were in, if they selected the billboard icon on their mapping application.

The previous example is of a static billboard, one that has a known and constant latitude, longitude and elevation. It is possible that there could be mobile billboards or advertisements that are displayed on differing sides and locations of trains, busses, or even blimps and these advertisements can be dynamic with changing latitude, longitude and elevation while in motion and have different angles of allowed address based not only on the user who is pointing at the object, but also the position and orientation of the object itself. For example, we find a user who is watching a golf tournament in person and there is a blimp providing overhead shot coverage of the tournament. The blimp is above the golf course and its position, altitude and pointing direction (the way the nose of the blimp is facing) are almost in a constant state of change. One side of this particular blimp has a beer advertisement and the other side of the blimp advertises tires. The allowable angle of address for each side of the advertisements on the blimp are therefore also in a constant state of change. At one moment, the alignment of the blimp may allow the user to point their device at the blimp and find out about the tires and at another moment the blimp will be in a different orientation and the user will be then able to point at the blimp's beer advertisement, possibly unlocking a coupon they can redeem for a cold beer while they enjoy the tournament. Note that with the blimp being airborne, the angle of address for the objects, in this case, the advertisements, is a three-dimensional ray, as some users may find themselves underneath the blimp and will be pointing at a much more enhanced upward direction. It may be that the user finds themselves at some distance from the blimp and that a certain distance threshold the blimp has no associated angles of address for its advertising and is shown to the user as just "blimp," and then the user may choose what advertisement they would like to engage with. If the blimp came closer to them or they got closer to the blimp, the associated angles of address could then be triggered.

Single sided billboards may also be given a unique angle of allowable address since these billboards often find themselves being displayed on the sides of buildings and it is unlikely that a user addressing the building will be interested in a billboard that that they cannot view and are therefore most likely outside of its allowable angle of address.

A further understanding may come from the next example. We have a city worker who is assigned maintenance of street signs using pointing based search to identify signs in need of repair. They find themselves driving down a divided road only with access to the signs that are on their side of the road and therefore facing them when they drive. Only the signs in the driver's direction of travel would be addressable and shown to the user. The other signs facing oncoming traffic would be rendered inaccessible by the divide are therefore not in the allowed angle of address. All signs on the other side of the road would not meet the defined angle of address until the user was driving on that side of the road and in the correct direction. It may be that if for some reason the worker needed to reverse down the road the system may apply the opposite angle of address and allow the user to access the sign's information based on their new reverse direction of travel. The same may be true for a driver using an AR aided driving system. Only the signs that were in their direction of travel would meet the parameters of address and would be displayed in the augmented vision for that user and no signs for oncoming traffic would be displayed to the user therefore making the augmented view of the scene more relevant, also much safer and less confusing for the user. Operators of trains, subways and light rail may also find such a system beneficial if operating a conveyance with an AR assisted viewing platform enhancing their view of the tracks ahead. They would only be shown signals and signs in the augmented view that were relevant to their direction of travel and that were in their defined angle of address.

A further understanding can be shown by a user interacting with another type of sided object, such as a train or transit stop that has tracks or routes going in opposite directions on either side of the station platform or stop. When the user points their mobile device in the direction of one side of the platform and the corresponding tracks they would be shown the direction of travel, destinations, different train lines or busses arriving on that side, arrival times etc. that corresponded with that side of the transit stop. When they point their device at the opposite side, they would be shown that side of the stop's relevant transit information. This would be especially useful if there was audio feedback from the device for the visually impaired.

Figure 10:
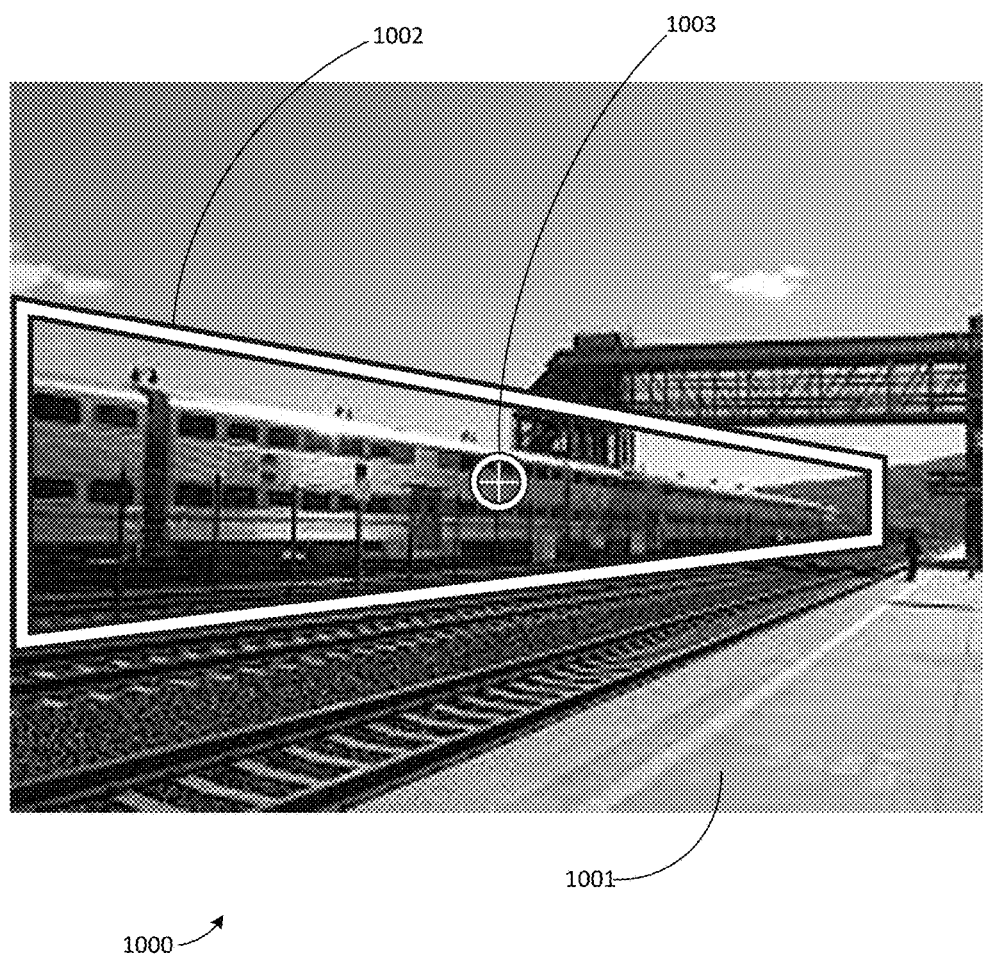
FIG. 10 is an illustration of a sided virtual object geolocated in a train station.

FIG. 10 is an illustration 1000 of a sided virtual object geolocated in a train station, in this case the Bayshore Station of the CalTrain system in the San Francisco Bay Area that runs from San Francisco to San Jose and parts south. The geolocated virtual object 1002 is a planar object oriented to be parallel to the tracks and centered between the Northbound and Southbound tracks. From the location that the image 1001 was captured, the optical axis 1003 of the imaging device intersects the virtual geolocated object 1002. The system would then determine the relative address bearing of the ray defined by the position of the imaging device and the heading of the imaging device's optical axis to the geolocated object. The system determines that the imaging device is in the "Southbound" address sector of the virtual geolocated object and would then display information relating to Southbound trains to the user of the system.

Another novel use can be shown when applied to the field of real world based geo-located gaming. For example, a game such as Pokémon Go (in English Pokémon means Pocket Monster) could be enhanced a great degree by utilizing the teachings described herein. Currently when a user has located a Pokémon, their ability to engage with and capture the Pokémon is not changed by their angle of address of the Pokémon. If the monster is looking away then they may have a better chance at capturing them since the user is approaching from the monster's blind side. If they engage the monster from the front, they may have a more challenging task in capturing the monster since the monster can "see" the would-be capturer and get ready to defend themselves from capture. It is also possible that differing angles may change the chance of capture, from the side, from below, from above etc. It is clear to imagine that these sort of gaming interactions could be taken to other types and styles of geo-located gaming such as war simulation. For example, what direction is that tank facing and what is the user's angle of engagement? In certain types of games, these differing methods of engagement of could be very dynamic and would be constantly changing as the game play progressed. The object being addressed can turn, rotate and move in three-dimensions, and therefore the engagement with the object being addressed may also change. The user's distance from the object being addressed may also influence the angle of allowed address and therefore also the type of interaction and engagement with the addressed object. A user far away from the object, our previous example of a virtual geo-located tank for instance, may have a smaller angle of allowed address and therefore a lesser chance of successful engagement with the object being addressed. The user's distance to an object may change, they may be accelerating towards the object or away from the object so their speed in either direction may also influence their angle of allowable address and their ability to interact with and engage the object.

In certain scenarios, it may be beneficial to use an object's defined angle of address to limit access to certain objects that may be contained within a larger object. For example, we have a user who is in Anaheim, Calif. and they are close to Disneyland. When they point their device at the park, they are only given the result "Disneyland" and none of the attractions contained within the park. All the objects within the park have defined angles of access that only allow them to be addressed when a user is within the walls of the park. This is determined by their distance to, and angle of address for each unique object within the park. For example, the popular attraction Space Mountain is quite close to the perimeter of the Disneyland Park. It would have an associated angle of address that allowed only users facing it from the direction corresponding to the interior of the park and also within a distance that had them located inside the parks boundaries. People pointing at it from the parking lot would not be within those parameters and would not be allowed to address the object. This scenario would also be beneficial for sporting parks and arenas and other large objects such as parks, malls etc. These larger objects, theme parks, malls buildings etc. and the smaller objects contained within them could contain geolocated nodes. Objects could contain nodes that are used to direct users to specific part of the object or allow users access to specific information relating to only part of the object. In effect, smaller geo-descriptors relating to an object that become available to be pointed at once the larger object has been accessed, or you are "inside"

the larger object. For example, a node can be the front door of a building. Another example of a node may be a door that is at some depth inside of the main object such as an elevator and it may have its own parameters for address and engagement, perhaps a distance and angle of address and engagement that requires the user to be inside of the main object, the building, and entering from a particular doorway, to address and engage the elevator node.

A further use could be realized in the following scenario. There is a single sided billboard facing east with a normal angle of address of 180 degrees. This billboard is for a national beer brand and they decide to run a flash-mob style ad reward campaign that gives the first 100 people to address and engage with this billboard a coupon to purchase the beer for a discount at a nearby merchant or bar. When the campaign begins, perhaps announced by social media, the angle and distance to address and engage with the billboard could be set at 180 degrees and radiate half a mile from the billboard. As more people began to engage with the billboard, the angle and distance of address and engagement could be changed to limit or enhance a user's chances of addressing and engaging with the billboard. The billboard's angle of address and engagement in effect would radiate or pulse as more, or less people engaged with the advertisement and had received their coupon. The ability to change the angle and distance of address and engagement may also change with the time of day. The beer company may not want people engaging with their advertisements after legal drinking hours in the billboard's geographic location were over, so the ability to interact with the object may even be nil. Peak hours for maximum angle and distance or address and engagement via AR or pointing search, happy hour for instance, could also be established. It may also be the case that a user's distance or motion whether towards or away from the billboard may influence the offer they receive when they engage with the billboard. Those users who are closer and moving towards the billboard may get the better discount than users who are further away and moving away from the billboard while engaging with it. Their speed towards or away from the addressed object may also have an influence on the users' engagement with the addressed object.

Figure 11:
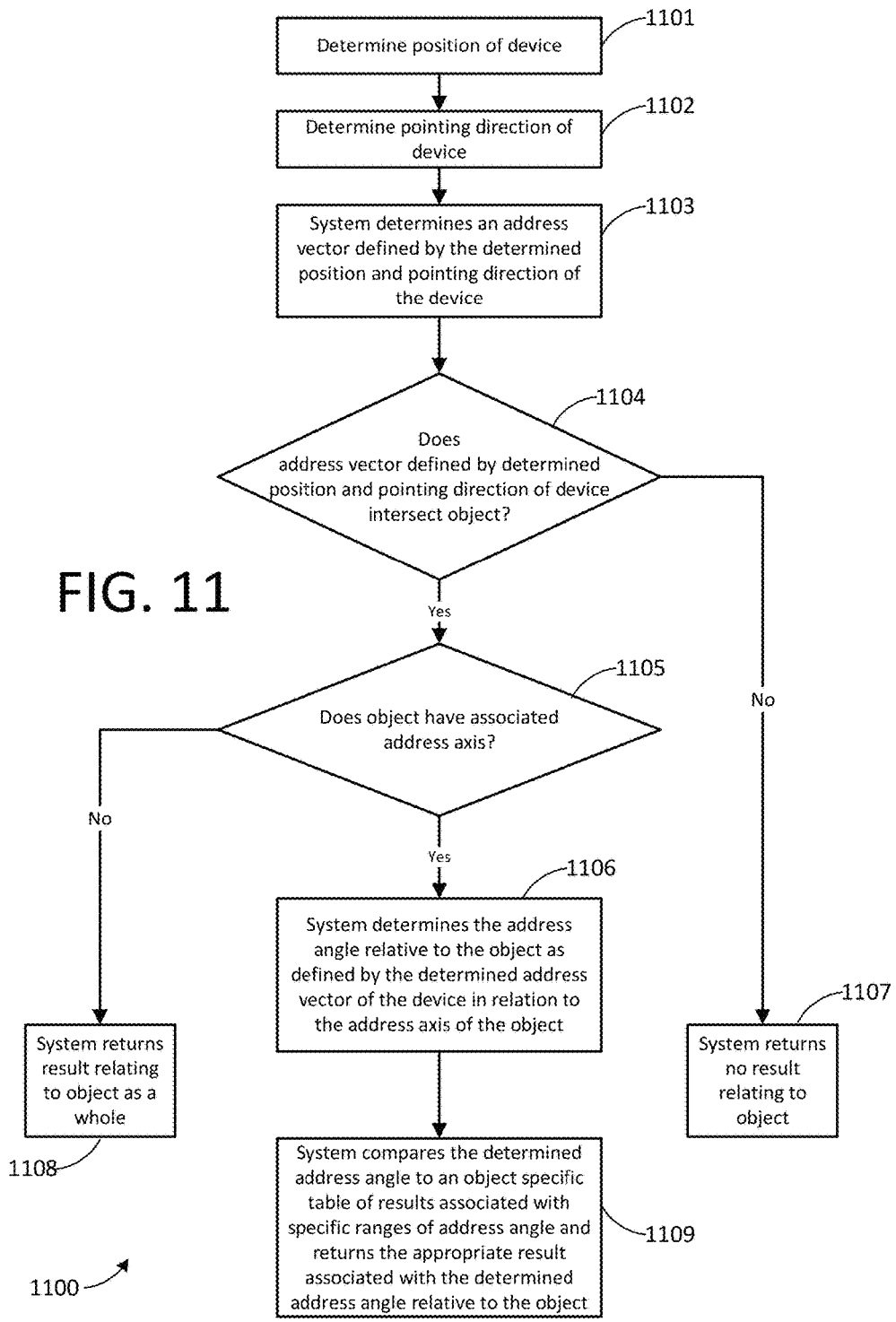
FIG. 11 is a flowchart describing a basic method of operation of the system.

FIG. 11 is a flowchart 1100 describing a basic method of operation in accordance with one embodiment. At a step 1101, the position of the mobile device is determined. This could be via GPS, GLONASS or other positioning systems known to the art. At a next step 1102, the pointing direction, i.e. heading, of the mobile device is determined. This may be in all three degrees of freedom (pitch, roll, and yaw) and may be determined by various means known to the art such as flux gate compass, accelerometers, an inertial measurement unit, analysis/recognition of camera-captured images or a combination of such means. At a next decision step 1104, the system determines if the ray defined by the determined position and pointing direction intersects a geocoded object in a database. This may be done by simple incidence calculation or other means. If the system determines that the ray does not intersect the geocoded object, control passes to a step 1107 in which no result relating to that object is returned. If the ray does intersect the geocoded object, control passes to a next decision step 1105. At step 1105, the system determines if the geocoded object has an associated address axis. If the geocoded object does not have an associated address axis, control passes to a step 1108 in which a result relating to the object is returned, which is not further defined by the angle of address of the ray at the object. If the geocoded object does have an associated address axis, control passes to a step 1106. In step 1106, the system determines the address angle of the ray in relation to the address axis of the geocoded object. At a next step 1109, the system compares the determined address angle to a table of results related to the geocoded object and returns a result corresponding to the range that encompasses the determined address angle of the ray.

Figure 12:
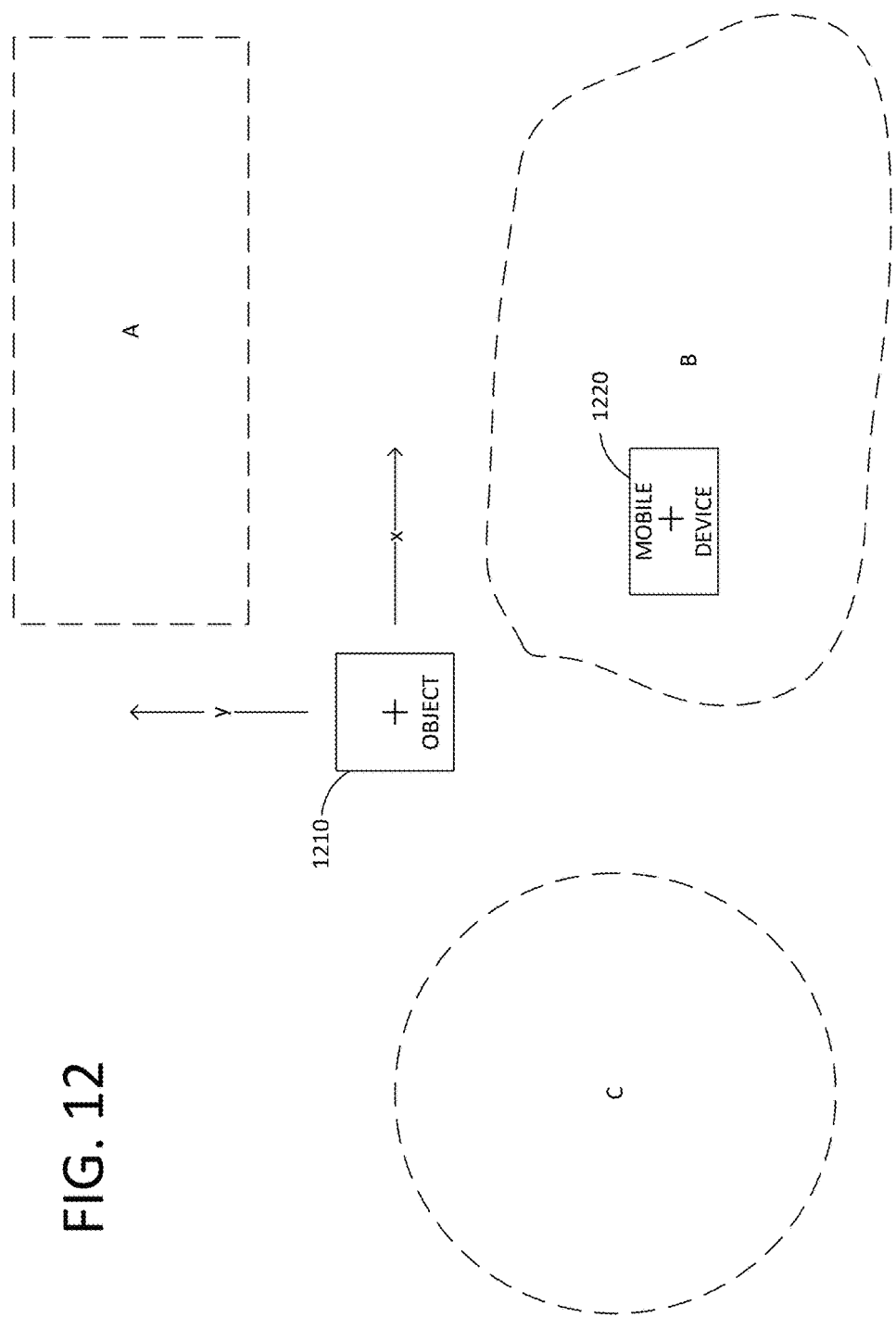
FIG. 12 illustrates a map of how different sets of information related to an object can be based on ranges of physical dispositions of a querying mobile device.

FIG. 12 illustrates a map of how different sets of information related to an object 1210 can be based on ranges of physical dispositions of a querying mobile device 1220. In FIG. 12, the object 1210 can be considered to have an origin denoted by a cross, and a two dimensional coordinate system can be considered to be established at the object's origin for purposes of demonstration (where one, two or three dimensions could be used in various embodiments). Other coordinate systems can be used in different embodiments. For example, coordinate systems can be established to be relative to an object, which may be beneficial when the object itself can move, such as when the object is a blimp or motor vehicle. Alternatively, coordinate systems can be established to be absolute, which may be beneficial when the object is stationary, such as when the object is a building or a billboard. When dealing with stationary objects, it may be useful to use Global Positioning System based coordinates for all objects handled by a system.

Referring to FIG. 12, using the established coordinate system, different regions, for example A, B and C as shown in dashed lines, can be defined with any shape or size and associated with different sets of information to be supplied in relation to the object 1210. For each region, the information associated with the region can be supplied in relation to the object in response to a query by the mobile device 1220 located (physically disposed) in one of the regions. For example, a user of a mobile device could bring the object 1210 within the view of an augmented reality application operating on mobile device 1220 and see a first advertisement when the mobile device is located (physically disposed) in region A, a second advertisement when in region B, and a third advertisement when in region C. While the regions A, B and C illustrate a rectangular region, an arbitrary closed loop and a circular region respectively, other regions can also be defined arbitrarily. For example a region can be a defined as range of distances from the object, in which case the region would appear as a finite thickness ring centered on the object on a map.

Although different sets of information, also referred to herein as different information content units, can be associated with different physical locations, the associations need not be limited to relative or absolute ranges of location alone. More generally, a querying mobile device can be understood to have a physical disposition within the coordinate system being used. As noted above, the coordinate system can be absolute or relative to an object. The physical disposition can include any or all of 6 degrees of freedom of the mobile device, including position (x, y, z) and attitude (roll, pitch and yaw). The physical disposition can also or alternatively include one or more of velocity (directional and/or rotational, each in up to 3 dimensions) and acceleration (directional and/or rotational, each in up to 3 dimensions) of the mobile device. Physical disposition can be defined using any coordinate system, such as absolute or relative and Cartesian or spherical.

An information content unit can be associated both with an object and with a physical disposition specification that defines a range of or filter for physical dispositions of mobile devices making the query. By way of example, a first physical disposition specification could be defined to include motion of mobile devices approaching an object, such as a restaurant, with an associated information content unit configured to display a coupon or advertisement for the restaurant. A second physical disposition specification could be defined to include motion of mobile devices away from the restaurant, with an associated an information content unit configured to show a "thank you for visiting" message.

An information content unit can be understood include or serve as a container for any information that can be associated with an object to be queried. An information content unit can be, for example, any data needed to display or convey information to a user. An information content unit can include, for example, one or more of textual information, images, audio, computer code, and layout information. An information content unit can include, for example, a package of information and/or data, received by an augmented reality application, that causes the augmented reality application to display media or content within a visual scene of the AR application. By way of another example, an information content unit can be a text string, such as a name of an object, that is displayed within an AR scene. An information content unit can include image rendition data or a virtual object model useable to display or render an image of a virtual object in an augmented reality scene.

An information content unit can also be used to convey information to a user without an AR application or a camera-captured scene. For example, the heading of a mobile device can be determined based on a compass and/or accelerometer, and the device can be aimed, using it like a pointer, at a real or virtual object. When the device is so aimed by a user within a matching physical disposition specification for the object, data from an associated information content unit can be displayed on the screen of the mobile device. As another example, an information content unit, such as a text or image advertisement, can be configured to be displayed in response to user-selection of an icon representing an object or geographic location on a mapping application.

Figure 13:
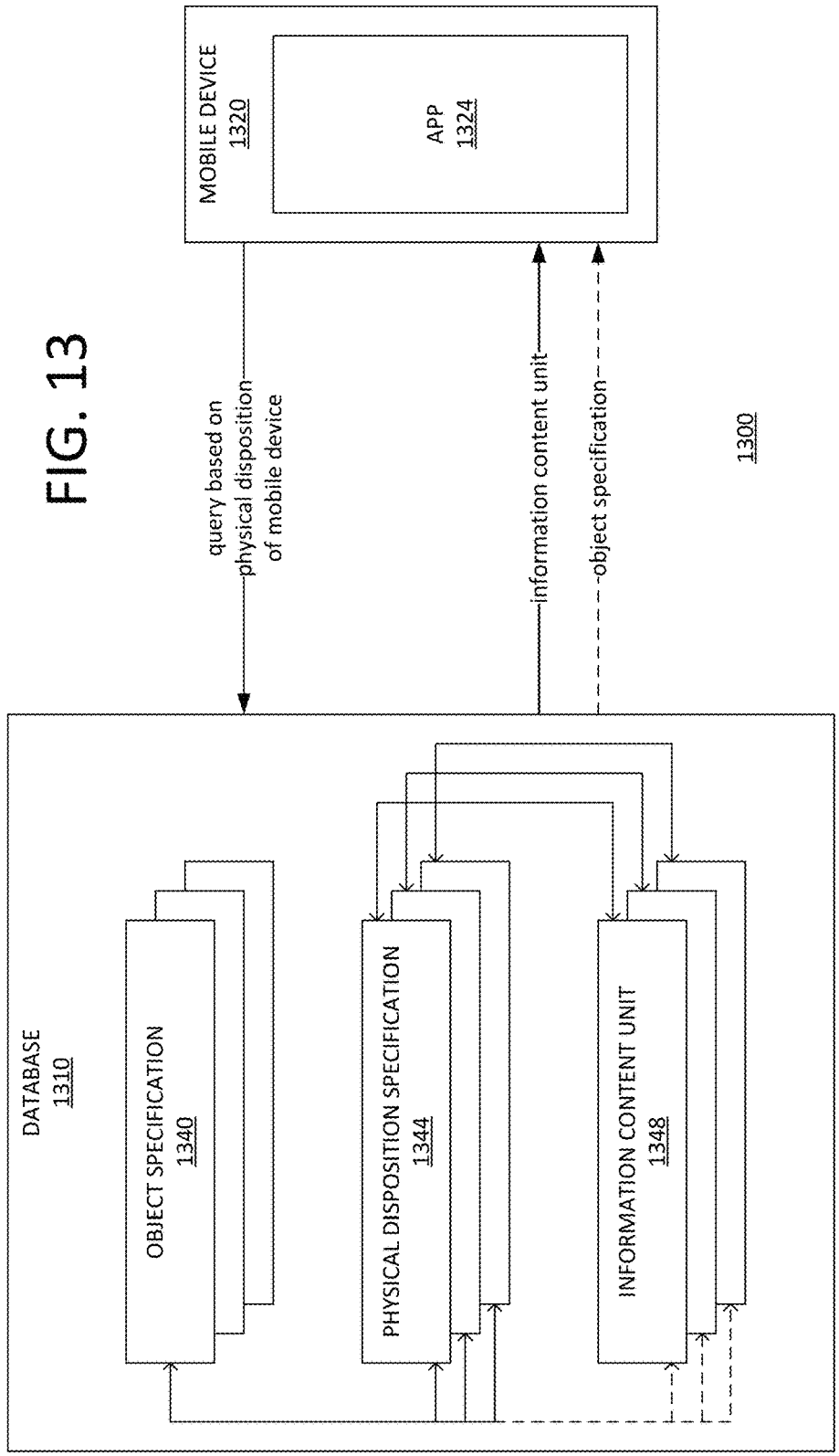
FIG. 13 illustrates an architecture diagram of a system, which can be a computer system, for providing geolocation sector-based information about objects.
Figure 14:
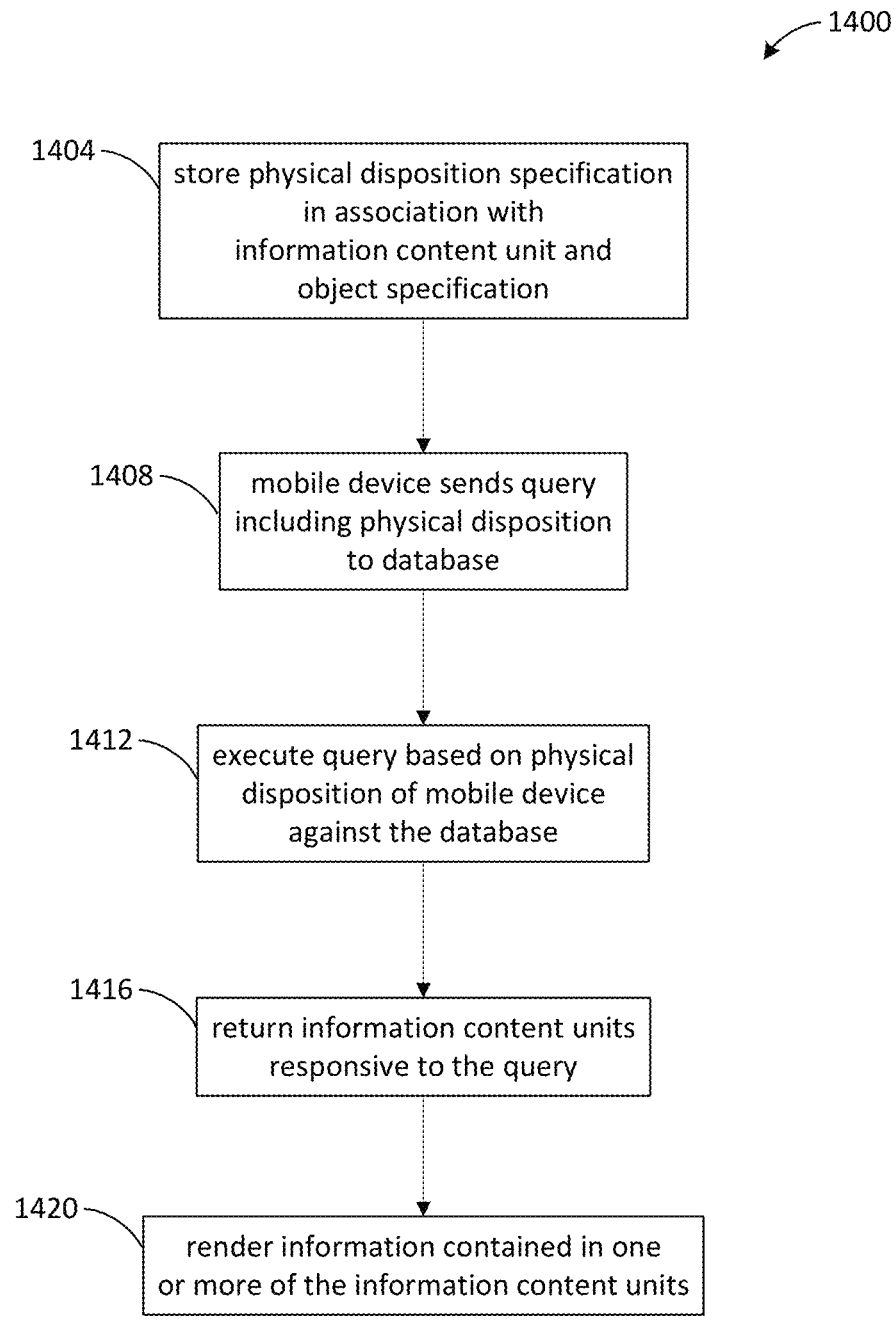
FIG. 14 illustrates a method that can be performed by the system to provide geolocation sector-based information about objects.

FIG. 13 illustrates an architecture diagram of a system 1300, which can be a computer system, for providing geolocation sector-based information about objects. FIG. 14 illustrates a method 1400 that can be performed by the system 1300 to provide geolocation sector-based information about objects. Referring to FIGS. 13 and 14, the method 1400 will now be described in conjunction with the system 1300.

At a step 1404, for one or more physical disposition specifications 1344, the physical disposition specification is stored in a database 1310 in association with both an information content unit 1348 and an object specification 1340. The object specification 1340 can include, for example, an identifier or name of the object, a location of the object in an absolute or relative coordinate system, and a shape or physical definition of the object, which can be used to determine whether a mobile device 1320 is oriented towards the object. The object can identify a real object that exists in the real world or it can identify a virtual object that need not correspond to a real world object.

Each of multiple object specifications 1340 can be associated with one or more physical disposition specifications 1344 with each physical disposition specification representing a range of physical dispositions to be associated with an information content unit 1348. Each information content unit 1348 can be associated indirectly with one or more object specifications by way of being directly associated with one or more physical disposition specifications, each of which physical disposition specifications is in turn directly associated with an object specification. Optionally, each information content unit can also be associated directly with an object specification as shown by the dashed lines in the illustration. A single information content unit can be associated directly or indirectly with multiple object specifications, for example, if the same content is to be provided for multiple objects.

At a step 1408, the mobile device 1320 sends a query to the database 1310. The query can be initiated by an app (application) 1324 executing on the mobile device. The app 1324 can be, for example, an augmented reality application, a mapping application, or an application that allows a user to point the mobile device at an object in order to obtain information about the object. The database query can include a physical disposition of the mobile device, which, as discussed above, can in turn include one or more of location (e.g. a geographic location), orientation, velocity and acceleration of the mobile device.

In the case that an absolute coordinate system is used, geographic locations can be specified for physical disposition of the mobile device as well as the physical disposition specifications stored in the database. In the case that a relative coordinate system is used, a Cartesian coordinate system, for example, can be established relative to an object, and the relative coordinate system can be registered relative to the mobile device, such as by having the mobile device perform a homography relative to an image captured by the mobile device's camera and containing the object.

In one embodiment, the database 1310 can be hosted, for example, on a server computer or computer system that can be remotely accessed through a wireless network by the mobile device 1320. The server computer or computer system, in turn can execute received queries against the database and return results to requesting mobile devices. In one embodiment, the database 1310 can be hosted, at least in part, on the mobile device 1324 itself, so that queries can be executed more quickly without communication to a remote server. In one embodiment, portions of a remote database can be downloaded to and cached on a mobile device, such as, based on geographic location, to improve performance.

At a step 1412, the system 1300 executes the query based on the physical disposition of the mobile device against the database 1310. At a step 1416, the database 1310 returns zero or more information content units responsive to the query. In the case that the physical disposition of the mobile device does not match any of the physical disposition specifications 1344 in the database, a null result can be returned. If the physical disposition of the mobile device does, however, match one or more physical disposition specifications, then one or more associated information content units can be returned to the mobile device 1320 as will be described further below. At a step 1420, the app 1324 renders the information contained in one or more of the returned information content units.

In a first embodiment with respect to the step 1412, the physical disposition of the mobile device sent along with the database query includes the geographic position and orientation of the mobile device. In this embodiment, the database can be configured to apply the techniques described above with respect to FIGS. 1-11 in order to obtain an information content unit associated with an object. The object specification can include a geographic location and a shape of the object, and the physical disposition specifications associated with the object can define one or more sectors or regions for the object. Each physical disposition specification can in turn be associated with an information content unit to be returned for a match. The database can be queried to identify an information content unit associated with a sector or region containing the geographic position of the mobile device, where the sector is associated with an object that, based on the object's shape and position, is intersected by a ray defined by the mobile device's geographic position and orientation. The matching information content unit can then be returned to the mobile device 1320 and displayed to a user by the app 1324.

In a second embodiment with respect to the step 1412, the database query can be applied based on only the geographic position of the mobile device. This embodiment can be used to obtain multiple results from a remotely located database, with each result returned in conjunction with an object specification including the location and shape of the object. An app 1324 can use the orientation of the mobile device to select an object in accordance with the techniques described above with respect to FIGS. 1-11 based on the returned object specifications including the location and shape of each object. The app 1324 can process the multiple returned results on the fly as the mobile device is reoriented by a user to display the current information content unit 1348 retrieved from local memory for the addressed object. In this manner, multiple queries to the database 1310 can be avoided as the mobile device is reoriented by a user from a single location.

In a third embodiment with respect to the step 1412, more generally, the database query on the physical disposition of the mobile device can be applied without regard to the position and shape of the objects being queried. This embodiment can also be used to obtain multiple results from a remotely located database, which can then be filtered on the fly by the app 1324. In this case, an app 1324 can be agnostic to the orientation of the device, such as a north-up mapping application, and can be configured to display an icon for each result returned by the database query. In general, a query specifying a physical disposition of the mobile device can be executed to obtain a set of zero or more matching physical disposition specifications. For example, a query specifying a geographic location can match a specific geographic region "A" within the physical disposition specifications. In general, each matching physical disposition specification, in turn, can be associated with one or more object specifications and information content units. For each matching physical disposition specification, the matching information content units and associated object specifications are returned to the mobile device. For example, region A is associated with the virtual object Alpha, a restaurant, located at coordinates X, Y and an information content unit advertisement "Z". The app 1324 can then use the location and optionally the name and/or shape of each returned object specification to display an icon on a map. An icon can then be selected by a user in order to access the information content unit, for example, in order to show the advertisement.

In a fourth embodiment, which is a variation on the third embodiment above, the object specification can represent a mere geographic or physical location, with no associated virtual or physical object and no associated shape. In this fourth embodiment, an object specification specifying the physical location can be associated with multiple defined regions, such as the regions A, B, and C as in FIG. 12, discussed above, and a different information content unit associated with each region (physical disposition specification). A query from a mobile device in (or satisfying) each of the different defined regions (physical disposition specification) would return an associated different information content unit with respect to the physical location.

Computer Implementation

Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include standalone, client and/or server computers, which can be optionally networked through wired and/or wireless networks as a networked computer system.

Figure 15:
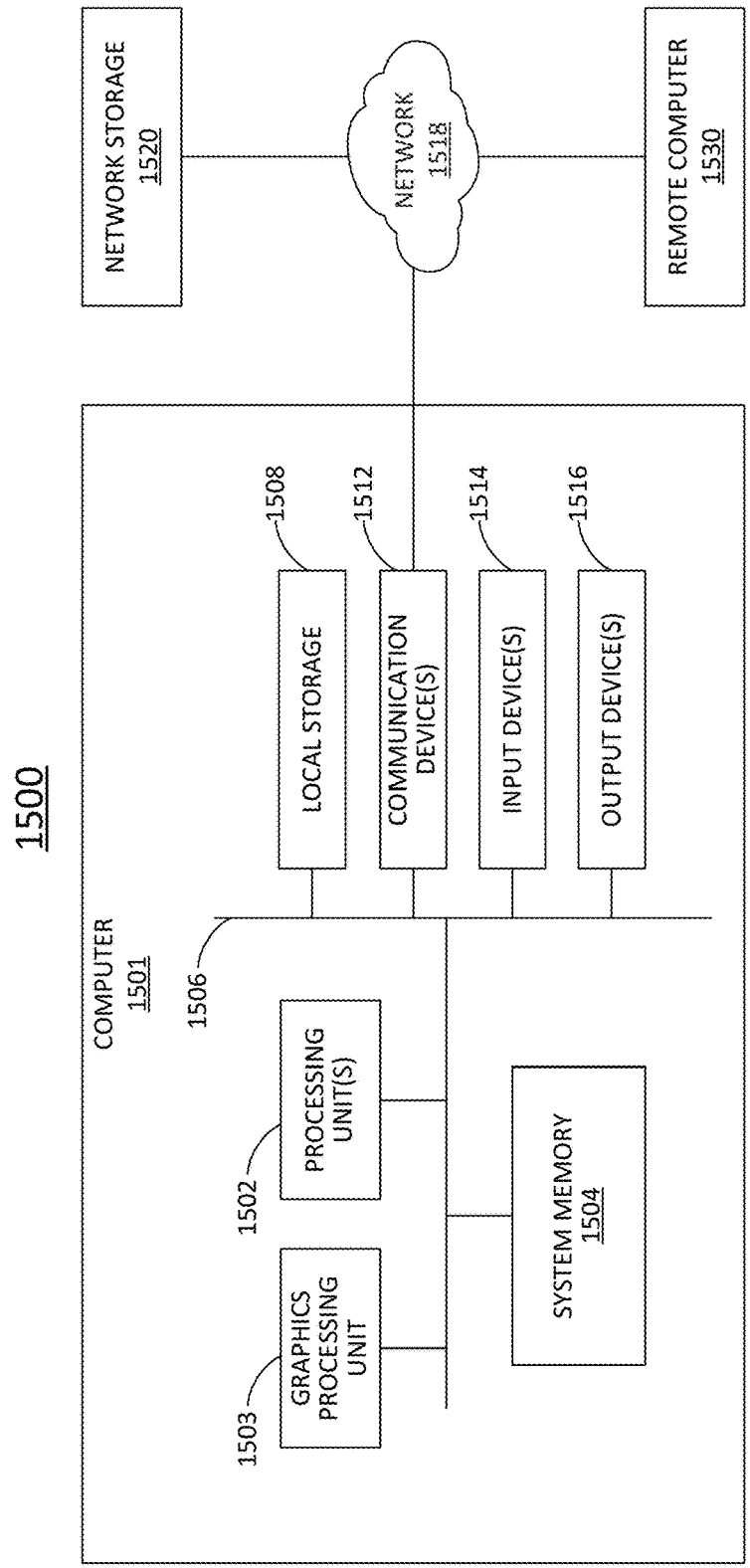
FIG. 15 illustrates a general computer architecture that can be appropriately configured to implement components disclosed in accordance with various embodiments.

FIG. 15 illustrates a general computer architecture 1500 that can be appropriately configured to implement components disclosed in accordance with various embodiments. The computing architecture 1500 can include various common computing elements, such as a computer 1501, a network 1518, and one or more remote computers 1530. The embodiments disclosed herein, however, are not limited to implementation by the general computing architecture 1500.

Referring to FIG. 15, the computer 1501 can be any of a variety of general purpose computers such as, for example, a server, a desktop computer, a laptop computer, a tablet computer or a mobile computing device. The computer 1501 can include a processing unit 1502, a system memory 1504 and a system bus 1506.

The processing unit 1502 can be any of various commercially available computer processors that can include one or more processing cores, which can operate independently of each other. Additional co-processing units, such as a graphics processing unit 1503, also can be present in the computer.

The system memory 1504 can include volatile devices, such as dynamic random access memory (DRAM) or other random access memory devices. The system memory 1504 can also or alternatively include non-volatile devices, such as a read-only memory or flash memory.

The computer 1501 can include local non-volatile secondary storage 1508 such as a disk drive, solid state disk, or removable memory card. The local storage 1508 can include one or more removable and/or non-removable storage units. The local storage 1508 can be used to store an operating system that initiates and manages various applications that execute on the computer. The local storage 1508 can also be used to store special purpose software configured to implement the components of the embodiments disclosed herein and that can be executed as one or more applications under the operating system.

The computer 1501 can also include communication device(s) 1512 through which the computer communicates with other devices, such as one or more remote computers 1530, over wired and/or wireless computer networks 1518. Communications device(s) 1512 can include, for example, a network interface for communicating data over a wired computer network. The communication device(s) 1512 can include, for example, one or more radio transmitters for communications over Wi-Fi, Bluetooth, and/or mobile telephone networks.

The computer 1501 can also access network storage 1520 through the computer network 1518. The network storage can include, for example, a network attached storage device located on a local network, or cloud-based storage hosted at one or more remote data centers. The operating system and/or special purpose software can alternatively be stored in the network storage 1520.

The computer 1501 can have various input device(s) 1514 such as a keyboard, mouse, touchscreen, camera, microphone, accelerometer, thermometer, magnetometer, or any other sensor. Output device(s) 1516 such as a display, speakers, printer, eccentric rotating mass vibration motor can also be included.

The various storage 1508, communication device(s) 1512, output devices 1516 and input devices 1514 can be integrated within a housing of the computer, or can be connected through various input/output interface devices on the computer, in which case the reference numbers 1508, 1512, 1514 and 1516 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Program-specific Integrated Circuits (ASICs), Program-specific Standard Products (ASSPs), System-on-a-chip systems (SOCs), and Complex Programmable Logic Devices (CPLDs).

Although the subject matter has been described in terms of certain embodiments, other embodiments, including embodiments which may or may not provide various features and advantages set forth herein will be apparent to those of ordinary skill in the art in view of the foregoing disclosure. The specific embodiments described above are disclosed as examples only, and the scope of the patented subject matter is defined by the claims that follow.

In the claims, the term "based upon" shall include situations in which a factor is taken into account directly and/or indirectly, and possibly in conjunction with other factors, in producing a result or effect. In the claims, a portion shall include greater than none and up to the whole of a thing.

The invention claimed is:

1. A method performed by a computer system, the method comprising, the computer system:
   storing a plurality of information content units in a database;
   storing in the database, for each of a plurality of objects, an object specification comprising an identifier, a shape and a geographic location of the object;
   for each object of the plurality of objects:
       for each sector of a plurality of sectors, wherein the each sector defines a geographic space, associating the sector in the database with a different one of the plurality of information content units and with the object specification for the each object,
   wherein for at least one of the objects, at least one of the plurality of sectors defines the geographic space by at least a range of distances from the object's geographic location;
   receiving a query specifying a queried geographic position and orientation;
   querying the database to identify a sector containing the queried geographic position, wherein the sector is associated with an object that, based on object's shape and geographic position, is intersected by a ray defined by the queried geographic position and orientation, and wherein the sector defines the geographic space by at least a range of distances from the object's geographic location; and
   returning, in response to the query, an information content unit associated with the identified sector.

2. The method of claim 1, wherein at least one of the plurality of objects is a virtual object.

3. The method of claim 1, further comprising returning, in response to the query, an object specification associated with the identified sector.

4. The method of claim 3, wherein the query is received from a mobile device configured to use the returned information content unit and the object specification to provide information to a user.

5. The method of claim 4, wherein at least one of the information content units comprises text data configured to be displayed within an augmented reality user interface in spatial association with an associated geographic location.

6. The method of claim 4, wherein the returned information content unit is displayed in spatial relationship to the geographic location of the returned object specification within an augmented reality interface.

7. The method of claim 1, wherein each information content unit comprises one or more items selected from the group consisting of text, images, video, unstructured data and structured data.

8. The method of claim 1, wherein for at least one of the objects, at least one sector of the plurality of sectors defines an arc of a circle centered on the object's geographic location.

9. The method of claim 1, wherein for the at least one of the objects the range of distances from the object's geographic location, defines a portion of a finite width ring centered on the object's geographic location.

10. The method of claim 2, wherein for at least one of the objects, at least one of the plurality of sectors is further associated with a range of speeds, and wherein the query further specifies a speed of the mobile device.

11. The method of claim 2, wherein for at least one of the objects, at least one of the plurality of sectors is further associated with a range of directions of travel, and wherein the query further specifies a direction of travel of the mobile device.

12. The method of claim 2, wherein for at least one of the objects, at least one of the plurality of sectors is further associated with a range of velocities, and wherein the query further specifies a velocity of the mobile device.

13. The method of claim 2, wherein for at least one of the objects, at least one of the plurality of sectors is further associated with a range of accelerations, and wherein the query further specifies an acceleration of the mobile device.

14. The method of claim 1, wherein the object specification further comprises an orientation of the object.

15. The method of claim 1, wherein the queried orientation represents an orientation of a mobile device.

16. The method of claim 1, wherein the queried orientation represents a direction of travel.

\* \* \* \* \*

UNITED STATES PATENT AND TRADEMARK OFFICE
CERTIFICATE OF CORRECTION

PATENT NO. : 10,037,343 B1
APPLICATION NO. : 15/878146
DATED : July 31, 2018
INVENTOR(S) : Thomas William Ellenby et al.

Page 1 of 1

It is certified that error appears in the above-identified patent and that said Letters Patent is hereby corrected as shown below:

In the Claims

In Column 20, Line 59, Claim 9, delete "objects" and insert -- objects, --, therefor.

In Column 20, Line 60, Claim 9, delete "location," and insert -- location --, therefor.

Signed and Sealed this
Twenty-third Day of October, 2018

Andrei Iancu
*Director of the United States Patent and Trademark Office*